(12) United States Patent
Geiger et al.

(10) Patent No.: US 11,536,937 B2
(45) Date of Patent: Dec. 27, 2022

(54) LIGHT-EMITTING OPTOELECTRONIC MODULES

(71) Applicant: ams Sensors Singapore Pte. Ltd., Singapore (SG)

(72) Inventors: Jens Geiger, Eindhoven (NL); Olivier Ripoll, Eindhoven (NL)

(73) Assignee: AMS SENSORS SINGAPORE PTE. LTD., Singapore (SG)

( * ) Notice: Subject to any disclaimer, the term of this patent is extended or adjusted under 35 U.S.C. 154(b) by 275 days.

(21) Appl. No.: 16/957,523

(22) PCT Filed: Oct. 24, 2018

(86) PCT No.: PCT/SG2018/050534
§ 371 (c)(1),
(2) Date: Jun. 24, 2020

(87) PCT Pub. No.: WO2019/132773
PCT Pub. Date: Jul. 4, 2019

(65) Prior Publication Data
US 2021/0018734 A1    Jan. 21, 2021

Related U.S. Application Data

(60) Provisional application No. 62/611,272, filed on Dec. 28, 2017.

(51) Int. Cl.
*G02B 19/00* (2006.01)
*G02B 5/02* (2006.01)
*G02B 27/48* (2006.01)
*G02B 3/08* (2006.01)

(52) U.S. Cl.
CPC .......... *G02B 19/0052* (2013.01); *G02B 3/08* (2013.01); *G02B 5/02* (2013.01); *G02B 27/48* (2013.01)

(58) Field of Classification Search
CPC ........ G02B 19/0052; G02B 3/08; G02B 5/02; G02B 5/0278; G02B 27/48
See application file for complete search history.

(56) References Cited

U.S. PATENT DOCUMENTS

| | | | |
|---|---|---|---|
| 5,978,528 | A | 11/1999 | Fidric |
| 6,081,381 | A | 6/2000 | Shalapenok et al. |

(Continued)

FOREIGN PATENT DOCUMENTS

| | | |
|---|---|---|
| CN | 1731272 A | 2/2006 |
| CN | 101238735 A | 8/2008 |

(Continued)

OTHER PUBLICATIONS

International Search Report with Written Opinion for related Application No. PCT/SG2018/050534 dated Jan. 14, 2019 (10 Pages).

(Continued)

*Primary Examiner* — Ryan D Howard
(74) *Attorney, Agent, or Firm* — Viering, Jentschura & Partner mbB

(57) ABSTRACT

Light-emitting optoelectronic modules operable to generate an emission characterized by reduced speckle can include a coherent light source, a diffuser, and a Fresnel element. The coherent light source is operable to generate a coherent emission, characterized by a coherence length, incident on the diffuser. The diffuser is characterized by a divergence angle. The divergence angle is the angle between a first path-length from the diffuser to a Fresnel element and a second path-length from the diffuser to the Fresnel element, wherein their difference defines a path difference. In some instances, the path difference is substantially larger than the coherence length.

13 Claims, 2 Drawing Sheets

(56) References Cited

U.S. PATENT DOCUMENTS

| | | |
|---|---|---|
| 6,606,173 B2 | 8/2003 | Kappel et al. |
| 2002/0075460 A1 | 6/2002 | Kappel et al. |
| 2005/0207160 A1 | 9/2005 | Babayoff et al. |
| 2006/0012842 A1 | 1/2006 | Abu-Ageel |
| 2006/0039160 A1 | 2/2006 | Cassarly et al. |
| 2007/0171521 A1 | 7/2007 | Sugawara et al. |
| 2008/0204847 A1 | 8/2008 | Kamm et al. |
| 2008/0212091 A1 | 9/2008 | Tanaka et al. |
| 2008/0297731 A1 | 12/2008 | Powell et al. |
| 2011/0038037 A1 | 2/2011 | Canova et al. |
| 2012/0080411 A1 | 4/2012 | Mizuyama et al. |
| 2014/0118702 A1 | 5/2014 | Taniguchi et al. |
| 2015/0049343 A1 | 2/2015 | Shaked et al. |
| 2016/0377878 A1 | 12/2016 | Cayer |
| 2017/0123218 A1 | 5/2017 | Stigwall et al. |

FOREIGN PATENT DOCUMENTS

| | | | |
|---|---|---|---|
| CN | 105676478 A | 6/2016 | |
| CN | 107357123 A | 11/2017 | |
| EP | 2626728 B1 * | 3/2022 | ......... G02B 19/0052 |
| JP | 2000206449 A | 7/2000 | |
| JP | 2000268603 A | 9/2000 | |
| JP | 4182580 B2 | 11/2008 | |
| JP | 2011501207 A | 1/2011 | |
| JP | 2013210487 A | 10/2013 | |
| WO | 2012122677 A1 | 9/2012 | |

OTHER PUBLICATIONS

International Preliminary Report on Patentability for related Application No. PCT/SG2018/050534 dated Jun. 30, 2020 (7 Pages).

Extended Search Report issued from the European Patent Office for related Application No. 18896437.3 dated Aug. 26, 2021 (9 Pages).

Chinese First Search Report issued for the corresponding CN patent application No. CN2018800904163, dated Nov. 23, 2021, 2 pages (For informational purposes only).

Chinese Suplementary Search Report issued for the corresponding CN patent application No. CN2018800904163, dated Jun. 8, 2022, 3 pages (For informational purposes only).

* cited by examiner

LIGHT-EMITTING OPTOELECTRONIC MODULES

CROSS-REFERENCE TO RELATED APPLICATION

This application is the U.S. national stage entry, under 35 U.S.C. § 371, of International Application No. PCT/SG2018/050534, filed Oct. 24, 2018, which claims priority to U.S. Provisional Patent Application Ser. No. 62/611,272, filed on Dec. 28, 2017, the contents of which are incorporated herein by reference in their entirety.

TECHNICAL FIELD

This disclosure relates to light-emitting optoelectronic modules operable to emit light exhibiting reduced speckle.

BACKGROUND

Light-emitting optoelectronic modules operable to generate coherent light are sometimes used to illuminate an object or multiple objects with rough surfaces. Rough surfaces can be characterized by 10 to 100 μm surface features (e.g., grooves) in some instances. Coherent light incident on rough surfaces can generate speckle. Speckle is undesirable for some applications.

In some instances, the distance between a light-emitting optoelectronic module and the rough surface can change; consequently, over time, the speckle can appear as noise. For example, a light-emitting optoelectronic module operable to generate coherent light can be used to illuminate a scene, including one or more objects, in order to capture an image of the scene. The resulting image, captured under typical conditions, would exhibit temporal noise.

In some instances, noise due to speckle can be averaged over time (e.g., to an overall grey tone). In some instances, a diffuser is positioned in front of a coherent light source, and can be rotated while the image is being collected. Consequently, the noise originating from speckle can be averaged out over time in the collected image. In some instances, frequency modulation or other components can be used to average out speckle.

However, these approaches require an elongated exposure time to collect an image and can consume resources, such as power resources. An approach is needed that would permit immediate exposure, and reduced consumption of resources.

SUMMARY

This disclosure describes coherent light-emitting modules (e.g., lasers, such as excimer lasers or vertical-cavity surface emitting lasers) and optoelectronic modules that incorporate coherent light-generating modules operable to emit light that has reduced speckle (e.g., digital cameras).

In an aspect, for example, a light-emitting optoelectronic module includes a coherent light source operable to generate coherent light. The coherent light is characterized by a coherence length, a bandwidth, and a center wavelength. The light-emitting optoelectronic module further includes a diffuser that is characterized by a divergence angle. This divergence angle can be defined as the full-width at half maximum angle of the transmitted light for a collimated beam incident beam. The diffuser also may be operated in a reflective mode, e.g. with the diffusive surface covered by a conformal, high reflective coating, such as a thin, (e.g., 1 μm to 10 μm) metal layer. The diffuser is positioned with respect to the coherent light source such that the coherent light is incident on the diffuser, and the diffuser is operable to generate a diffuse emission. The light-emitting optoelectronic module further includes a Fresnel lens element. The Fresnel lens element includes an array of Fresnel rings. The Fresnel lens can refer to any optical element where all rays emitted from a point at a specific distance f (i.e., the focal length), are inside the acceptance angle of the lens (i.e., the numerical aperture of the lens). In some instances, the thickness of the Fresnel lens (e.g., the center thickness), can be significantly smaller (e.g., by a factor of two or greater) than a spherical lens of the same focal length. Consequently, the Fresnel lens can be a refractive, diffractive, or other optical element or can include optical metamaterials. The Fresnel lens element is positioned with respect to the diffuser such that the diffuse emission is incident on the Fresnel lens element and the Fresnel lens element generates an emission with reduced speckle.

In some implementations, the light-emitting optoelectronic module includes a divergence angle. The divergence angle is the angle between a first path-length from a diffuser to a Fresnel lens element and a second path-length from the diffuser to the Fresnel lens element. The first and second path-length emanate from the same point on the diffuser.

In some implementations, the light-emitting optoelectronic module includes a first path-length that is orthogonal to a diffuser and a Fresnel lens element.

In some implementations, the light-emitting optoelectronic module includes a difference in length between a first path-length and a second path-length, the difference being a path difference. The path difference is larger than the coherence length.

In some implementations, the light-emitting optoelectronic module includes a path difference that is larger than a coherence length by a factor sufficient to generate an emission with reduced speckle.

In some implementations, the light-emitting optoelectronic module includes a path difference that is larger than a coherence length by a factor (e.g., 2-1000) sufficient to generate an emission with reduced speckle. For example, the path difference can be two times the coherence length in some instances. In other instances, the path difference can be 1000 times the coherence length.

In some implementations, the light-emitting optoelectronic module includes a path difference that is larger than a coherence length by a factor (e.g., 1000-10,000) sufficient to generate an emission with reduced speckle.

In some implementations, the light-emitting optoelectronic module includes a number of discrete Fresnel rings in an array of Fresnel rings numbering at least 10.

In some implementations, the light-emitting optoelectronic module includes a diffuse emission that is incident on at least 10 discrete Fresnel rings within an array of Fresnel rings.

In some implementations, the light-emitting optoelectronic module includes a coherent light source that further includes a laser diode.

In some implementations, the light-emitting optoelectronic module includes a coherent light source that further includes an array of laser diodes.

In some implementations, the light-emitting optoelectronic module includes a diffuser that further includes a holographic diffuser, sand-etched diffuser, and/or an engineered diffuser.

In some implementations, the light-emitting optoelectronic module includes a diffuser that further includes a microlens array.

In some implementations, the light-emitting optoelectronic module includes a first path-length that is substantially equal to a focal length of a Fresnel lens element.

In some implementations, the light-emitting optoelectronic module includes a coherent light source operable to generate coherent light. The coherent light is characterized by a coherence length, a bandwidth, and a center wavelength, and the center wavelength corresponds to one or more wavelengths within the infrared portion of the electromagnetic spectrum.

In some implementations, the light-emitting optoelectronic module includes a coherent light source operable to generate coherent light. The coherent light is characterized by a coherence length, a bandwidth, and a center wavelength, and the center wavelength is 850 nm, the bandwidth is 10 nm, and the coherence length is 23 µm.

This disclosure also describes an imaging system that can include an imager and a light-emitting optoelectronic module.

In some instances, the imaging system includes a light-emitting optoelectronic module. The light-emitting optoelectronic module includes a coherent light source operable to generate coherent light. The coherent light is characterized by a coherence length, a bandwidth, and a center wavelength. The light-emitting optoelectronic module further includes a diffuser, characterized by a divergence angle. The diffuser is positioned with respect to the coherent light source such that the coherent light is incident on the diffuser and the diffuser is operable to generate a diffuse emission. The light-emitting optoelectronic module further includes a Fresnel lens element characterized by an array of Fresnel rings. The Fresnel lens element is positioned with respect to the diffuser such that the diffuse emission is incident on the Fresnel lens element and the Fresnel lens element generates an emission.

In some instances, the imaging system includes an array of light-sensitive pixels, an optical assembly, and a spectral filter.

In some instances, the imaging system includes a coherent light source operable to generate intensity modulated light, and an array of light-sensitive pixels operable to demodulate intensity modulated light.

In some instances, the imaging system includes a divergence angle that is the angle between a first path-length from the diffuser to a Fresnel lens element and a second path-length from the diffuser to the Fresnel lens element, the first and second path-lengths emanating from the same point on the diffuser.

In some instances, the imaging system includes a first path-length that is orthogonal to the diffuser and the Fresnel lens element.

In some instances, the imaging system includes a difference in length between the first and second path lengths that is a path difference, the path difference being larger than the coherence length.

In some instances, the imaging system includes a path difference that is larger than the coherence length by a factor sufficient to generate an emission with reduced speckle.

Other aspects, features and advantages will be readily apparent from the following detailed description, the accompanying drawings, and the claims.

DETAILED DESCRIPTION

Figure 1:
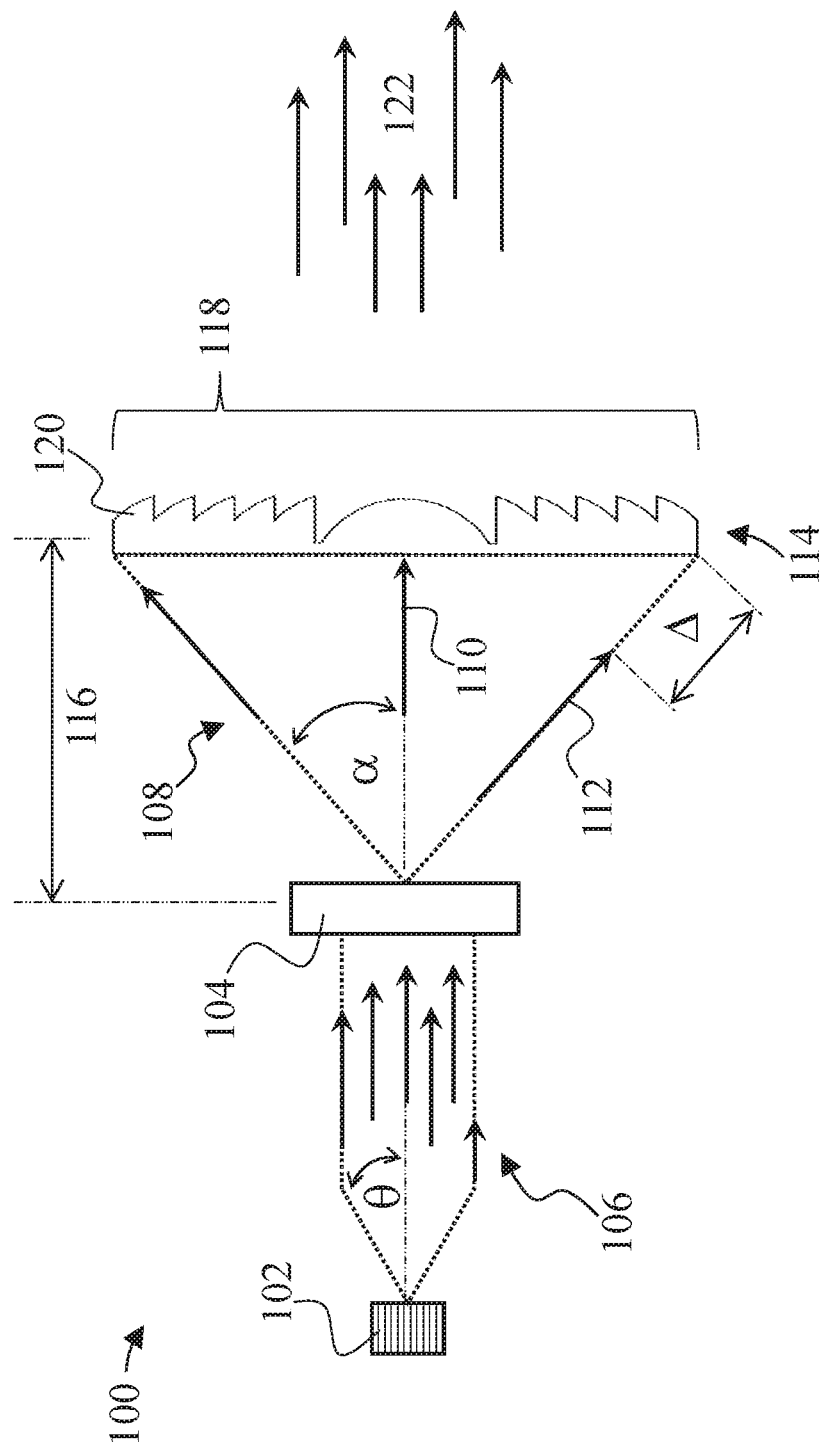
FIG. 1 depicts an example of a light-emitting optoelectronic module.

FIG. 1 depicts an example of a light-emitting optoelectronic module 100. The light-emitting optoelectronic module 100 includes a coherent light source 102 and a diffuser 104. The coherent light source 102 is operable to generate coherent light 106. Coherent light 106 can be characterized by a coherence length, a bandwidth, and a center wavelength. In some instances, the center wavelength corresponds to one or more wavelengths within the infrared portion of the electromagnetic spectrum. In some instances, the center wavelength is 850 nm, the bandwidth is 10 nm, and the coherence length is 23 µm. In some instances, the coherent light source 102 includes a laser diode, such as an edge-emitting or vertical-cavity surface-emitting laser, or an array of laser diodes. In such instances, the laser diode or array of laser diodes can be characterized by a numerical aperture related to θ as depicted in FIG. 1.

The diffuser 104 can be positioned with respect to the coherent light source 102 such that the coherent light 106 is incident on the diffuser 104 and the diffuser 104 is operable to generate a diffuse emission 108. The diffuser 104 can be any element that divides an incident collimated beam into a large number (e.g., more than 10) of beamlets that are distributed over all angles between 0 and a divergence angle α of the diffuser. The diffuser need not be a rough surface. It may be a refractive or diffractive material, volume diffuser or metamaterial. In some instances, the diffuser 104 is a holographic diffuser, sand-etched diffuser, and/or an engineered diffuser. In some instances, the diffuser 104 includes a microlens array.

The diffuser 104 can be characterized by the divergence angle α. The divergence angle α is the angle between a first path-length 110 and a second path-length 112. The first path-length 110 is the distance between the diffuser 104 and a Fresnel lens element 114. The Fresnel lens can refer to any optical element where all rays emitted from a point at a specific distance f (i.e., the focal length), are inside the acceptance angle of the lens (i.e., the numerical aperture of the lens). In some instances, the thickness of the Fresnel lens element 114 (e.g., the center thickness), is significantly smaller (e.g., by a factor of two or greater) than a spherical lens of the same focal length. Consequently, the Fresnel lens element 114 can be a refractive, diffractive, or other optical element or can include optical metamaterials. The Fresnel lens element 114 is positioned with respect to the diffuser 104 such that the diffuse emission 108 is incident on the Fresnel lens element 114 and the Fresnel lens element generates an emission 122. The second path-length can be another distance between the diffuser 104 and the Fresnel lens element 114. In some instances, the first and second path-lengths 110, 112 emanate from the same point on the diffuser 104 as depicted in FIG. 1. In some instances, the first path-length 110 is orthogonal to the diffuser 104 and the Fresnel lens element 114. Still in some instances, the Fresnel lens element 114 can be characterized by a focal length 116, wherein the first path-length 110 can be substantially equal to the focal length 116.

The difference in length between the first and second path lengths 110, 112 is a path difference Δ. The path difference Δ can be defined by: $\Delta = f \times (1/\cos \alpha - 1)$, where $f$ is the first path-length 110, and α is the divergence angle between the first and second path-lengths 110, 112, respectively. The path difference is larger than the coherence length in some instances. The path difference can be larger than the coherence length by a factor sufficient to generate an emission with reduced speckle. In some instances, the factor is between two and 1000. In some instances, the factor is between 1000 and 10,000.

The Fresnel lens element 114 includes an array of Fresnel rings 118. The array of Fresnel rings 118 in the illustrated example includes at least 10 discrete Fresnel rings 120. In some instances, the diffuse emission 108 is incident on at least 10 of the discrete Fresnel rings 120 within the array of Fresnel rings 118.

Figure 2:
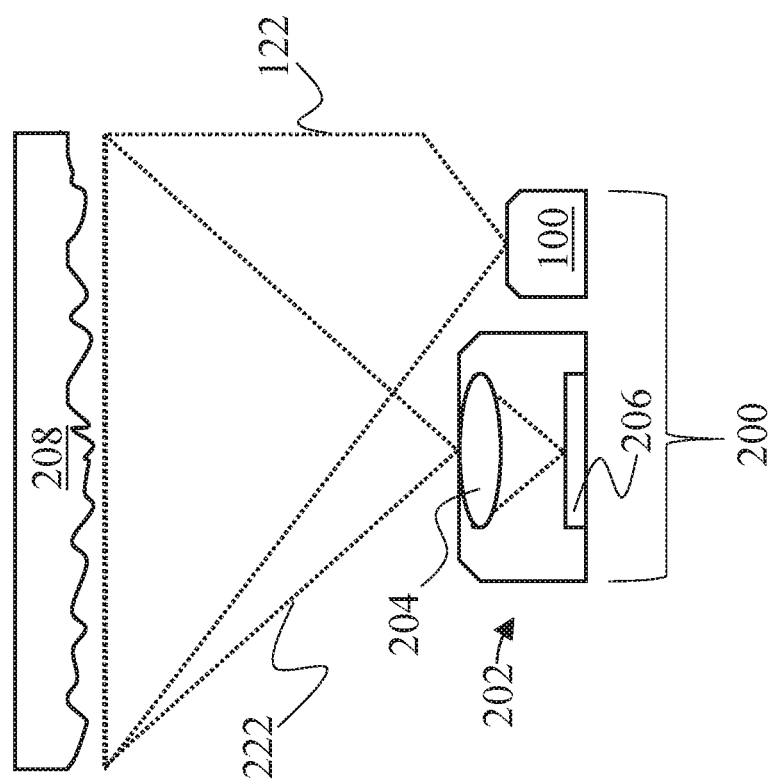
FIG. 2 depicts an example of an imaging system.

FIG. 2 depicts an example of an imaging system 200. The imaging system 200 includes a light-emitting optoelectronic module 100 as depicted in FIG. 1, an imager 202, an optical assembly 204, and an array of light-sensitive pixels 206. The optical assembly 204 can include one or more refractive or diffractive optical elements. In some instances, the optical assembly 204 can include one or more spectral filters (e.g., dielectric, optical resin, or polyester optical filters). The array of light-sensitive pixels 206 can include charge-coupled devices and/or complimentary metal-oxide semiconductor devices. In some instances, the array of light-sensitive pixels can include a color filter array. The imager 202 can include other components, such as spectral filters, apertures, stops, spacers, processors, and other circuitry.

The light-emitting optoelectronic module 100 is operable to generate an emission 122 having reduced speckle as described above. The emission 122 can be incident on an object 208. A portion 222 of the emission 122 can reflect from the object 208 and be focused by the optical assembly 204 onto the array of light-sensitive pixels 206.

In some instances, the imaging system 200 is operable to collect an intensity image or images of the object 208. For example, the emission 122 can be generated from coherent light 106, where coherent light 106 is characterized by one or more center wavelengths corresponding to the visible portion of the electromagnetic spectrum. Further, the array of light-sensitive pixels 206 can be sensitive to the visible portion of the electromagnetic spectrum in such instances. Consequently, an intensity image having reduced noise due to speckle can be captured.

In some instances, the imaging system 200 is operable to collect distance data via the indirect time-of-flight technique. For example, the light-emitting optoelectronic module 100 can be operable to generate an intensity modulated emission 122. Further, the array of light-sensitive pixels 206 can be operable to demodulate intensity modulated light in such instances. Consequently, distance data with reduced noise due to speckle can be captured.

Various modifications may be made to the foregoing implementations. Features described above in different implementations may be combined in the same implementations. Thus, other implementations are within the scope of the claims.

What is claimed is:

1. A light-emitting optoelectronic module comprising:
a coherent light source operable to generate coherent light, the coherent light being characterized by a coherence length, a bandwidth, and a center wavelength;
a diffuser, characterized by a divergence angle, the diffuser being positioned with respect to the coherent light source such that the coherent light is incident on the diffuser and the diffuser is operable to generate a diffuse emission; and
a Fresnel lens element including an array of Fresnel rings;
wherein the Fresnel lens element is positioned with respect to the diffuser such that the diffuse emission is incident on the Fresnel lens element and the Fresnel lens element generates an emission,
wherein the divergence angle is an angle between a first path-length from the diffuser to the Fresnel lens element and a second path-length from the diffuser to the Fresnel lens element, the first and second path-lengths emanating from a same point on the diffuser,
wherein the first path-length is orthogonal to the diffuser and the Fresnel lens element, and wherein a difference in length between the first and second path lengths is a path difference, the path difference being larger than the coherence length.

2. The light-emitting optoelectronic module of claim 1, wherein the path difference is larger than the coherence length by a factor sufficient to generate an emission with reduced speckle.

3. The light-emitting optoelectronic module of claim 2, wherein the factor is between two and 1000.

4. The light-emitting optoelectronic module of claim 2, wherein the factor is between 1000 and 10,000.

5. The light-emitting optoelectronic module of claim 1, wherein the array of Fresnel rings includes at least ten discrete Fresnel rings within the array of Fresnel rings.

6. The light-emitting optoelectronic module of claim 5, wherein the diffuse emission is incident on at least ten of the Fresnel rings within the array of Fresnel rings.

7. The light-emitting optoelectronic module of claim 1, wherein the coherent light source includes an array of laser diodes.

8. An imaging system, the imaging system comprising:
an imager; and
a light-emitting optoelectronic module comprising:
a coherent light source operable to generate coherent light, the coherent light being characterized by a coherence length, a bandwidth, and a center wavelength;
a diffuser, characterized by a divergence angle, the diffuser being positioned with respect to the coherent light source such that the coherent light is incident on the diffuser and the diffuser is operable to generate a diffuse emission; and
a Fresnel lens element including an array of Fresnel rings;
wherein the Fresnel lens element is positioned with respect to the diffuser such that the diffuse emission is incident on the Fresnel lens element and the Fresnel lens element generates an emission,
wherein the divergence angle is the angle between a first path-length from the diffuser to the Fresnel lens element and a second path-length from the diffuser to the Fresnel lens element, the first and second path-lengths emanating from the same point on the diffuser,
wherein the first path-length is orthogonal to the diffuser and the Fresnel lens element, and wherein the difference in length between the first and second path lengths is a path difference, the path difference being larger than the coherence length.

9. The imaging system of claim 8, the imager including an array of light-sensitive pixels, an optical assembly, and a spectral filter.

10. The imaging system of claim 8, wherein the path difference is larger than the coherence length by a factor sufficient to generate an emission with reduced speckle.

11. The imaging system of claim 8, wherein the array of Fresnel rings includes at least ten discrete Fresnel rings within the array of Fresnel rings.

12. The imaging system of claim 11, wherein the diffuse emission is incident on at least ten of the Fresnel rings within the array of Fresnel rings.

13. The imaging system of claim 8, wherein the coherent light source includes an array of laser diodes.

* * * * *